US009047459B2

(12) United States Patent
Lu

(10) Patent No.: US 9,047,459 B2
(45) Date of Patent: Jun. 2, 2015

(54) ELECTRONIC DEVICE AND METHOD FOR RESETTING UNLOCKING PASSWORD OF THE ELECTRONIC DEVICE

(75) Inventor: Yong-Liang Lu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 459 days.

(21) Appl. No.: 13/523,952

(22) Filed: Jun. 15, 2012

(65) Prior Publication Data

US 2013/0212657 A1 Aug. 15, 2013

(30) Foreign Application Priority Data

Feb. 9, 2012 (CN) .......................... 2012 1 0028302

(51) Int. Cl.
  *G06F 17/30* (2006.01)
  *G06F 21/44* (2013.01)
  *H04L 29/06* (2006.01)
  *H04L 9/32* (2006.01)
  *G07F 7/10* (2006.01)

(52) U.S. Cl.
  CPC ............. *G06F 21/44* (2013.01); *H04L 63/083* (2013.01); *H04L 9/3226* (2013.01); *G06F 2221/2131* (2013.01); *G07F 7/1083* (2013.01)

(58) Field of Classification Search
  CPC ................ H04L 63/083; H04L 9/3226; G06F 2221/2131; G06F 7/1083
  See application file for complete search history.

(56) References Cited

U.S. PATENT DOCUMENTS

| 7,103,909 | B1* | 9/2006 | Kondo et al. ..................... 726/2 |
| 7,353,536 | B1* | 4/2008 | Morris et al. ..................... 726/6 |
| 8,566,611 | B2* | 10/2013 | Kobayashi et al. ........... 713/189 |
| 2003/0048174 | A1* | 3/2003 | Stevens et al. ............... 340/5.64 |
| 2003/0182584 | A1* | 9/2003 | Banes et al. .................. 713/202 |
| 2006/0041932 | A1* | 2/2006 | Cromer et al. ..................... 726/6 |
| 2006/0224882 | A1* | 10/2006 | Chin ............................. 713/150 |
| 2012/0011577 | A1* | 1/2012 | Mashimo .......................... 726/7 |

* cited by examiner

*Primary Examiner* — Techane Gergiso
(74) *Attorney, Agent, or Firm* — Novak Druce Connolly Bove + Quigg LLP

(57) ABSTRACT

A computerized method resets an unlocking password of an electronic device. Verification information used for resetting a first unlocking password currently used for unlocking the electronic device, and a destination for receiving a second unlocking password in place of the first unlocking password are preset in the electronic device. A request message from a terminal device is monitored in real-time, and checked for the inclusion of the verification information. The second unlocking password is generated, the first unlocking password of the electronic device is replaced by the second unlocking password, and the second unlocking password is sent to the destination if the verification information is included in the request message.

14 Claims, 2 Drawing Sheets

ELECTRONIC DEVICE AND METHOD FOR RESETTING UNLOCKING PASSWORD OF THE ELECTRONIC DEVICE

BACKGROUND

1. Technical Field

Embodiments of the present disclosure relate to data security, and particularly to a method for resetting an unlocking password of an electronic device and the electronic device using the method.

2. Description of Related Art

For data security, many people like to lock an electronic device into a standby mode. When a user wants to use the electronic device again, a valid unlocking password needs to be inputted to unlock the electronic device. However, many electronic devices do not provide any convenient and safe solution to reset the password, and if the user forgets the password, the electronic device cannot be unlocked. Therefore, people may experience difficulties if they forget the unlocking password of the electronic device.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
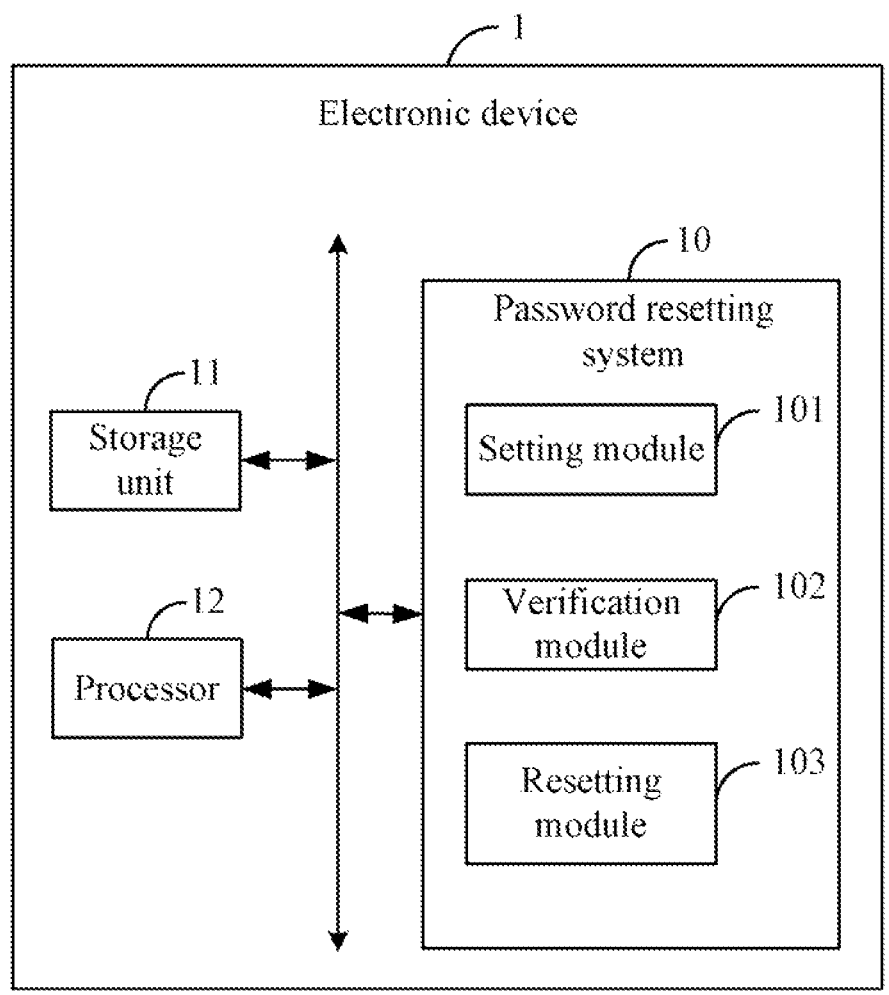
FIG. 1 is a schematic block diagram illustrating one embodiment of an electronic device including an unlocking password resetting system.

FIG. 1 illustrates one embodiment of an electronic device 1 with data security feature. The electronic device 1 includes a password resetting system 10, a storage unit 11, and at least one processor 12. In one embodiment, the electronic device 1 may be, for example, a panel computer, a smart phone, a personal digital assistant, or other similar device. FIG. 1 shows only one example of the electronic device 1, and the electronic device 1 can include more or fewer components than those shown in the embodiment, or have a different configuration of the components.

The password resetting system 10 may include a plurality of programs in the form of one or more computerized instructions stored in the storage unit 11 and executed by the processor 12 to perform operations of the electronic device 1. In the embodiment, the password resetting system 10 includes a setting module 101, a verification module 102, and a resetting module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The setting module 101 sets verification information used for resetting a first unlocking password of the electronic device 1, and stores the verification information in the storage unit 11. In the embodiment, the first unlocking password is defined as the password which is currently used for unlocking the electronic device 1, which was preset by a user of the electronic device 1. In one example, the verification information may be, for example, a series of particular numbers, a unique text message, or other particular information predetermined by the user. When the first unlocking password needs to be reset using the verification information, a new unlocking password which is defined as a password (second unlocking password) generated to replace the first unlocking password. In addition, the setting module 101 further sets a destination for receiving the second unlocking password after the first unlocking password has been reset. The destination may be, for example, a mobile phone, or a predetermined E-mail address of the user.

The verification module 102 monitors a request message sent from a terminal device (e.g., a smart phone or a panel computer) in real-time after the electronic device 1 is locked, and verifies whether the verification information is included in the request message when the request message is received. In the embodiment, the request message is used to request a resetting of the first unlocking password of the electronic device 1. The request message may be sent to the electronic device 1 through a connection, such as a wireless communication network, between the electronic device 1 and the terminal device. The terminal device can be any communication device, such as a smart phone or a panel computer, which has the function of sending the request message to the electronic device 1, and it is not needed to be predefined in the electronic device 1 before sending the request message.

In one embodiment, the request message may be a text message having a particular format. If the user forgets the first unlocking password, he/she can send the request message that includes the verification information to the electronic device 1 using the terminal device, so as to request a resetting of the first unlocking password. For example, the user may edit the text message to include the verification information, and then send the text message to the electronic device 1 using the terminal device, so as to request a resetting of the first unlocking password of the electronic device 1.

The resetting module 103 generates the second unlocking password, and replaces the first unlocking password of the electronic device 1 with the second unlocking password, upon the condition that the verification information is included in the request message. After the first unlocking password is replaced, the resetting module 103 sends the second unlocking password to the destination. In the embodiment, the second unlocking password may be a randomly-formulated password.

After the second unlocking password is generated, the resetting module 103 may automatically unlock the electronic device 1 and notify the user, or the user can manually unlock the electronic device 1 using the second unlocking password obtained from the destination.

If the verification information is not included in the request message, the verification module 102 counts the number of times that a request message is received within a first predetermined time period, and then discontinues the resetting of the first unlocking password of the electronic device 1 within a second predetermined time period when the number of times counted exceeds a predetermined number, such as three.

Figure 2:
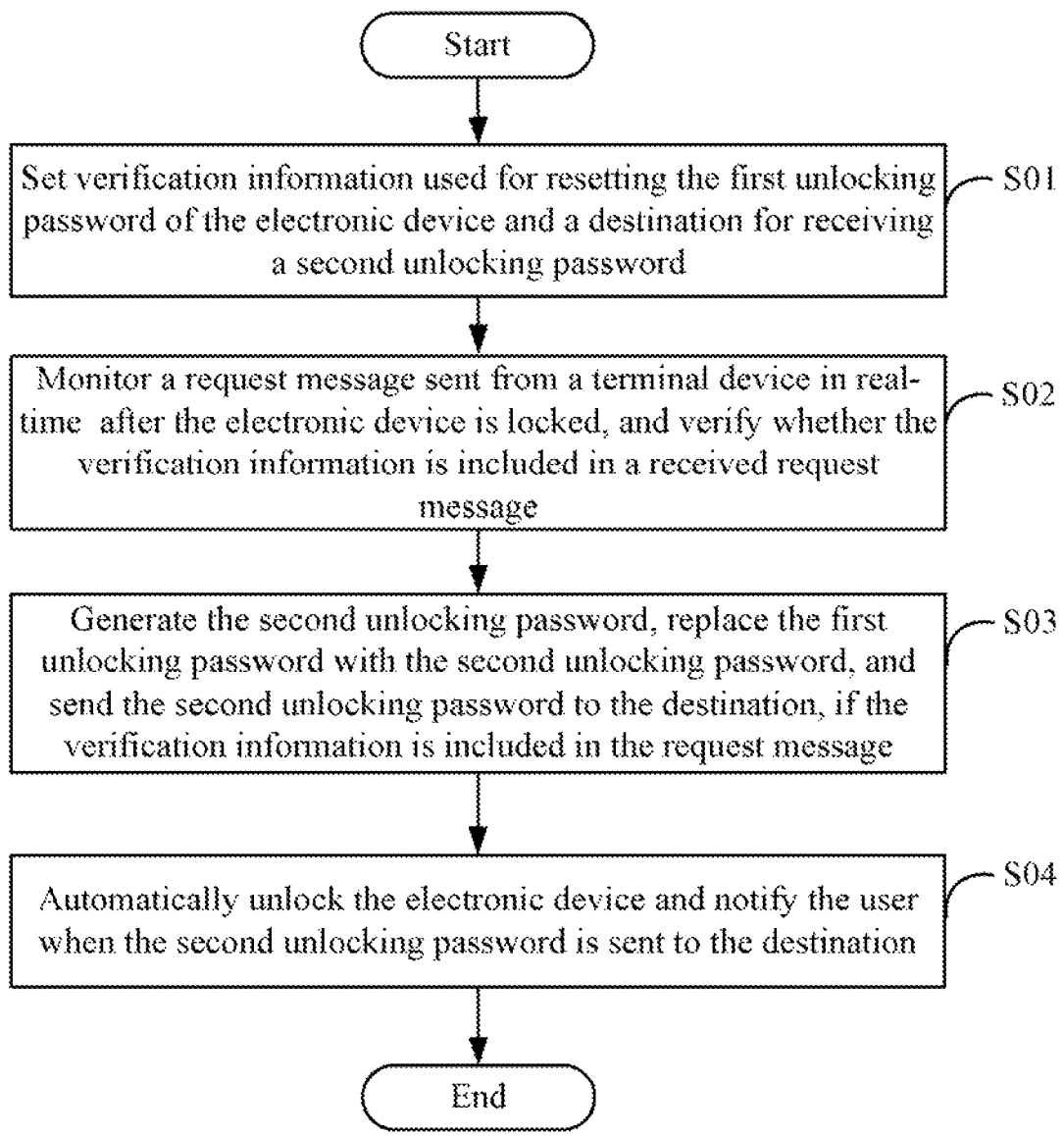
FIG. 2 is a flowchart of one embodiment showing a method for resetting an unlocking password of the electronic device of FIG. 1.

FIG. 2 is a flowchart of one embodiment showing a method for resetting the first unlocking password of the electronic device 1 of FIG. 1. Depending on the embodiment, additional steps may be added, others removed, and the ordering of the steps may be changed.

In step S01, the setting module 101 sets verification information used for resetting the first unlocking password of the electronic device 1 and a destination for receiving a second unlocking password to be generated to reset the first unlocking password of the electronic device 1. The destination may be, for example, a mobile phone, or an E-mail address of the user.

In step S02, the verification module 102 monitors a request message sent from a terminal device in real-time after the electronic device 1 is locked, and verifies whether the verification information is included in the request message when the request message is received. In the embodiment, the request message is used to request a resetting of the first unlocking password of the electronic device 1.

In step S03, the resetting module 103 generates a second unlocking password, replaces the first unlocking password with the second unlocking password, and sends the second unlocking password to the destination, upon the condition that the verification information is included in the request message.

In step S04, the resetting module 103 automatically unlocks the electronic device 1 and notifies the user when the second unlocking password is sent to the destination.

Additionally, in the step S02, if the verification information is not included in the request message, the verification module 102 counts the number of times that the electronic device 1 receives a request message within the first predetermined time period, and discontinues the resetting of the first unlocking password of the electronic device 1 within the second predetermined time period when the number of times counted exceeds a predetermined number, such as three.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for resetting an unlocking password of an electronic device, the method comprising:
   setting verification information used for resetting a first unlocking password of the electronic device and a destination for receiving a second unlocking password, wherein the first unlocking password is defined to be a password currently used for unlocking the electronic device, and the second unlocking password is defined as a new unlocking password to be generated for resetting the first unlocking password;
   monitoring a request message sent from a terminal device in real-time after the electronic device is locked, wherein the request message is used to request a resetting of the first unlocking password of the electronic device;
   verifying whether the verification information is included in a received request message; and
   generating the second unlocking password, replacing the first unlocking password of the electronic device with the second unlocking password, and sending the second unlocking password to the destination, upon the condition that the verification information is included in the request message.

2. The method according to claim 1, wherein the second unlocking password is a randomly-formulated password.

3. The method according to claim 1, further comprising:
   automatically unlocking the electronic device and notifying the user when the second unlocking password is sent to the destination.

4. The method according to claim 1, wherein the verifying step comprises:
   counting the number of times that the electronic device receives a request message within a first predetermined time period; and
   discontinuing the resetting of the first unlocking password of the electronic device within a second predetermined time period when the number of times counted exceeds a predetermined number.

5. The method according to claim 1, wherein the request message is a text message having a particular format.

6. The method according to claim 1, wherein the destination comprises a mobile phone and/or a predetermined E-mail address.

7. The method according to claim 1, wherein the terminal device is a communication device having the function of sending the request message to the electronic device, and the terminal device is not needed to be predefined in the electronic device before sending the request message.

8. An electronic device, comprising:
   a storage unit;
   at least one processor; and
   one or more programs stored in the storage unit and executed by the at least one processor, the one or more programs comprising:
   a setting module that sets verification information used for resetting a first unlocking password of the electronic device and a destination for receiving a second unlocking password, wherein the first unlocking password is defined to be a password currently used for unlocking the electronic device, and the second unlocking password is defined as a new unlocking password to be generated for resetting the first unlocking password;
   a verification module that monitors a request message sent from a terminal device in real-time after the electronic device is locked, and verifies whether the verification information is included in a received request message, wherein the request message is used to request a resetting of the first unlocking password of the electronic device; and
   a resetting module that generates the second unlocking password, replaces the first unlocking password of the electronic device with the second unlocking password, and sends the second unlocking password to the destination, upon the condition that the verification information is included in the request message.

9. The electronic device according to claim 8, wherein the second unlocking password is a randomly-formulated password.

10. The electronic device according to claim 8, wherein the resetting module further automatically unlocks the electronic device and notifies the user when the second unlocking password is sent to the destination.

11. The electronic device according to claim 8, wherein the verification module further counts the number of times that the electronic device receives a request message within a first predetermined time period, and discontinues the resetting of the first unlocking password of the electronic device within a second predetermined time period when the number of times counted exceeds a predetermined number.

12. The electronic device according to claim 8, wherein the request message is a text message having a particular format.

13. The electronic device according to claim 8, wherein the destination comprises a mobile phone and/or a predetermined E-mail address.

14. The electronic device according to claim 8, wherein the terminal device is a communication device having the function of sending the request message to the electronic device, and the terminal device is not needed to be predefined in the electronic device before sending the request message.

* * * * *